US 9,854,793 B2

(12) United States Patent
Hawley, Jr.

(10) Patent No.: US 9,854,793 B2
(45) Date of Patent: Jan. 2, 2018

(54) SURFCASTING BAG SYSTEM (71) Applicant: Frederic James Hawley, Jr., Lindenhurst, IL (US)

(72) Inventor: Frederic James Hawley, Jr., Lindenhurst, IL (US)

(*) Notice: Subject to any disclaimer, the term of this patent is extended or adjusted under 35 U.S.C. 154(b) by 143 days.

(21) Appl. No.: 14/983,910

(22) Filed: Dec. 30, 2015

(65) Prior Publication Data
US 2016/0192633 A1    Jul. 7, 2016

Related U.S. Application Data (60) Provisional application No. 62/099,460, filed on Jan. 3, 2015.

(51) Int. Cl.
*A01K 97/06* (2006.01)

(52) U.S. Cl.
CPC .................. *A01K 97/06* (2013.01)

(58) Field of Classification Search
CPC ......... A01K 79/00; A01K 97/00; A01K 97/06
USPC ...... 43/4.5, 54.1; 206/315.11; 224/920, 922; 2/336, 338
See application file for complete search history.

(56) References Cited

U.S. PATENT DOCUMENTS

| 3,181,751 | A |   | 5/1965  | Wilson            |             |
|-----------|---|---|---------|-------------------|-------------|
| 3,317,097 | A |   | 5/1967  | Giordano          |             |
| 4,691,469 | A |   | 9/1987  | Alsobrook et al.  |             |
| 4,708,243 | A |   | 11/1987 | Nailon            |             |
| 4,770,327 | A | * | 9/1988  | Fortson           | A01K 97/06  |
|           |   |   |         |                   | 220/533     |
| 4,831,771 | A | * | 5/1989  | Hoffken           | A01K 97/06  |
|           |   |   |         |                   | 43/54.1     |
| 4,867,358 | A | * | 9/1989  | Bennis            | A45F 3/16   |
|           |   |   |         |                   | 224/148.3   |
| 4,957,231 | A |   | 9/1990  | Kalisher          |             |
| 5,397,040 | A |   | 3/1995  | Lee               |             |
| 5,604,958 | A | * | 2/1997  | Anscher           | A45C 7/0086 |
|           |   |   |         |                   | 224/197     |

(Continued)

FOREIGN PATENT DOCUMENTS

GB         2381188       4/2003

OTHER PUBLICATIONS http://rapala.fishing/products/hip-pack Rapala brand hip-slung fishing pack.

(Continued)

*Primary Examiner* — Darren W Ark
*Assistant Examiner* — Brady W Frazier
(74) *Attorney, Agent, or Firm* — Law Office of Lesley A. Wallerstein, LLC (57) ABSTRACT I disclose here a system of interchangeable surfcasting bags and surfcasting equipment storage units. A variety of storage units are selectively secured to a base bag, waist belt or shoulder strap by a standardized tandem locking means. An upper lock is engaged with a simple twist of even a wet, gloved hand. A lower, secondary, lower lock latches in place and ensures the storage unit remains attached to its base in the harshest conditions. Storage units have male twisting locks and latches. Base bags, waist belts or shoulder straps have corresponding female twisting locks and latches. A distancing tool template is provided to ensure consistent and standard distance between upper and lower lock and latch components on all system pieces at all times.

5 Claims, 5 Drawing Sheets (56) References Cited

U.S. PATENT DOCUMENTS

| | | | |
|---|---|---|---|
| 5,619,819 A | | 4/1997 | Hauschild |
| 6,102,266 A | * | 8/2000 | Chacon ..................... A45F 5/00 |
| | | | 224/661 |
| 6,382,490 B1 | | 5/2002 | Divincenzo |
| 6,626,336 B1 | * | 9/2003 | Krusell ..................... A45F 5/02 |
| | | | 224/269 |
| 6,923,357 B2 | | 8/2005 | Smith |
| 7,213,364 B2 | | 5/2007 | Noraker |
| 8,052,020 B1 | | 11/2011 | Wurtz |
| 2003/0173390 A1 | * | 9/2003 | Smith ................... A01K 97/06 |
| | | | 224/604 |
| 2008/0301999 A1 | * | 12/2008 | Bergers ................. A01K 63/02 |
| | | | 43/55 |

OTHER PUBLICATIONS http://www.aliexpress.com/item/Free-Shipping-Red-Pvc-Leather-Waterproof-Waist-Pack-Belt-Fishing-Tackle-Bag-Fishing-Lure-Bag-Wood PandaMaster brand belted fishing bag.
http://www.aliexpress.com/item/SeaKnight-waterproof-camouflage-fishing-bag-travel-muitifunctional-mount-canvas-fishing-tackle-bagSeaKnight brand waterproof fishing bag.
http://www.alltackle.com/precision_pak.htm Precision Pak brand Ocean Shield III Surf Bag.

\* cited by examiner

SURFCASTING BAG SYSTEM

CROSS-REFERENCE TO RELATED APPLICATION (not applicable)

STATEMENT REGARDING FEDERALLY SPONSORED RESEARCH OR DEVELOPMENT (not applicable)

NAMES OF PARTIES TO A JOINT RESEARCH AGREEMENT (not applicable)

REFERENCE TO SEQUENCE LISTING, A TABLE OR A COMPUTER PROGRAM LISTING COMPACT DISC APPENDIX (not applicable)

FIELD OF THE INVENTION

This invention relates to wearable bags, belts and storage units for carrying and organizing surfcasting supplies.

BACKGROUND OF THE INVENTION

Surfcasting equipment today is not your father's rod and reel. Surfcasting is fishing on steroids. Fans are drawn, no, addicted to, the adrenaline rush that comes from fighting high, crashing waves, maintaining your balance on slippery and rocky terrain, and struggling to see under cover of darkness. This sport is not for the faint of heart. Surfcasters must be willing to risk life and limb for this adventure, sometimes at the expense of time with family and friends.

Surfcasting is done entirely standing up, either at the shoreline, or, by the hardcore, chest-deep in the water. Access to in-shore fish is limited only by the length of the rod, the tide and the height of the fisherman. Surfcasting rods are therefore at least twice as long as conventional boat or pier rods, and require the use of both hands, for that much more casting power.

Most popular in New York, New Jersey and Massachusetts, surfcasting has spread across the country, even to the west coast, Great Lakes and Canada. Anywhere there is a beach and waves, you can surfcast. Not surprisingly, it is a messy, wet and fickle enterprise. Much specialized equipment and clothing is necessary for comfort, safety and for fishing success.

Different types of fish are attracted to different lures, and surfcasters must have a numerous variety of lures at the ready to hook any one of the types of fish on a moment's notice. Synthetic lures called bucktail jigs and plugs look like miniature fish and come in infinite shape, size and colors. Fresh bait is also used, from pork rinds to eel to squid. Pork rinds in particular are so popular and widespread as to have become commodities in their own right packaged in standardized containers ("pork rind jars").

Clothing, shoes and equipment must be rugged enough to stand up not only to water, but to the salt in the water. Because surfcasters often spend hours off shore, they must carry all of their supplies on their person. Running back to the car is just not an option. Dedicated surfcasters depend on compact, yet lightweight, bags to organize, carry, and access their gear, all while being pelted with waves. The bag must resist not only salt water, but also the barbs of fish hooks and the points of knives. It must free the hands as much as possible.

An entire industry of surfcasting bags has developed to satisfy these needs. Prior art bags have multiple carrying options. Some models are carried over the shoulder as a camera bag. Others are worn about the waist, like a fanny pack or utility belt. Both comprise permanent and integral storage options, such as custom pockets sewn on an exterior surface, and rigid plastic tubes glued to the inside and enclosed with a flap. Yet other variations have detachable storage options, typically using metal or plastic carabiners. However, none have addressed the need for even more individualized storage options. None have made the interchanging of accessories as elegant and error-free, especially in the water, as I have here.

I have created a completely customizable surfcasting bag system. What sets this bag apart from all others is its built-in and interchangeable storage units that move seamlessly back and forth between a main bag base, a waist belt loop base, and a shoulder strap base, all with a simple twist-on, twist-off motion. The twisting lock is accompanied by a secondary, safety latching lock, making it impossible for the bags to spontaneously fall off. My system allows the fisherman to carry only and exactly what they need for a specific excursion, or to catch a particular species of fish. It eliminates the need to fiddle with tiny carabiner prongs with cold and wet hands. My fasteners operate as smoothly with wet gloves as they do with dry fingers.

BRIEF SUMMARY OF THE INVENTION

In accordance with one embodiment of the invention, I provide a surfcasting bag system with storage components which can be selectively and interchangeably attached from among a bag, a belt loop base, and optional shoulder strap. The cornerstone to this invention is the tandem fastener which comprises selectively and twistedly cooperating male and female parts. The female parts are permanently attached to the exteriors of the bag, belt loop, and optional shoulder strap. The male parts are permanently attached to the exteriors of any storage unit. In this way, the storage units can be twisted onto and twisted off the shoulder bag, belt loop attachment point or shoulder strap with a swift and elegant motion, and with a single gloved hand. The beauty of this fastener is how it can be operated with a minimum of dexterity. It can be used with wet hands, wet gloves, or completely dry hands. For added assurance against storage units getting accidentally knocked loose in high winds or rough water, storage units also attach to bases with a secondary, safety latching lock.

The body of the main bag bases and of the storage units must be made from a material which resists snagging and puncture from fish hooks, and also resists repeated exposure to marine salt water. A preferred material is Dacron® brand polyethylene terephthalate, but other materials can be used and still be within the scope of this invention. The material is preferably stacked two and three-ply and quilted together for added strength. A layer of abrasion-resistant interfacing is quilted to areas subject to high stress. Seams are preferably bound in similar material, both as a design element as well as for durability. The bonded polyester thread used to construct the bag, attach components and to quilt the layers together must also resist snagging, salt water, have high strength, low stretch, abrasion resistance, stability in sunlight (UVR) and resistance to mildew. The bottom, top and four sides of the bag will generally define a rectangular or square prism. Continuous with and depending forward from the top, and covering a front side should be a flap of the same material. This flap should have a fastener which mates with the front of the bag. The length, width and height of the bag can vary and be customized by those of ordinary skill in the art.

Shoulder straps must be made from a material that is resistant to abrasion, and salt water while still providing comfort. A preferred material is rugged polyester seatbelt webbing The shoulder strap is adjustable in length to accommodate a wide variety of body types. The length and width of the strap can be varied by those of ordinary skill in the art. Shoulder straps are either removable or permanently affixed to the bag at a variety of positions. Opposing ends of the strap can be attached to a rear panel of the bag, or to opposing side panels of the bag. Shoulder straps can be affixed directly or clipped to attached D-rings.

Affixed to and integrated with a bottom interior of each main bag is at least one lure tube. Each tube should be waterproof, rigid, hollow and open at the top, to organize and store lures or other necessities. Preferably, each tube is as tall as the bag, so that closing the top of the bag and fastening it shut covers the tube and prevents the contents from spilling. Preferably, the tube is transparent, for more quickly finding the desired lure. However, opaque materials can also be selected. A cap with drainage holes is affixed to the bottom of the tube.

Instead of affixing tubes to the bottom interior of the bag, it is also possible to install grommets. This is to facilitate drainage. Grommets are preferably stainless steel, to resist corrosion, but plastic and other similarly rustproof, waterproof and durable materials may be substituted.

Affixed to the exterior material of each main bag base, belt loop base, and optional shoulder strap are the female halves of the twisting lock and the latching lock. I have created a distancing template tool to ensure that the distance between the female half of the twisting lock and the female half of the latching lock are uniform from one base to another, and furthermore will accept the corresponding male halves of any system storage unit. These male halves are permanently affixed to the exterior material of various storage units. Both halves of the twisting lock are preferably sewn to its base. As with the bag construction, strong bonded polyester thread is preferred. The latching lock is secured via prongs that pierce the fabric or webbing.

The twisting lock and the latching lock cooperate in tandem to securely couple a storage unit to a base under even the harshest wind and water conditions. By adding a secondary, latching lock, a storage unit is secured to its base in two places. The latching lock limits rotation of the twisting lock, thereby preventing the twisting lock accidentally rotating and coming unlocked. Furthermore, in the event of a catastrophic failure of the twisting lock the storage unit is still tethered via that safety latch strap. In order to completely remove a storage unit, the latching lock must first be uncoupled and then the accessory can be rotated via the twist lock and removed.

These storage units can be designed to organize and protect a wide variety of specialized surfcasting equipment, such as pliers, knives, fish scalers, flashlights, water bottles, pork rind jars and cameras. With this system, the user can select a particular combination of supplies, and carry only what he needs for the day, on his bag, belt, or optional shoulder strap. Traveling light and efficiently is key.

These bags really take a beating from all the saltwater, rocks and fish hooks. Preferably they are equipped with only the highest quality, rust-proof, water-proof, and salt-proof fasteners.

REFERENCE NUMBERS 10 surfcasting bag system
20 belt
30 belt loop base
40 twisting lock, female component
40A center hole in twisting lock, female component
45 twisting lock, male half
45A protrusion in twisting lock, male component
50 latching lock, female component
55 latching lock, male component
60 distancing template tool
70 pork rind jar storage unit
80 phone or tool storage unit
90 fixed storage unit
100 main bag base
110 water bottle storage unit
120 front flap
130 shoulder strap base
140 quilting lines
150 binding

DETAILED DESCRIPTION OF THE INVENTION

Figure 1:
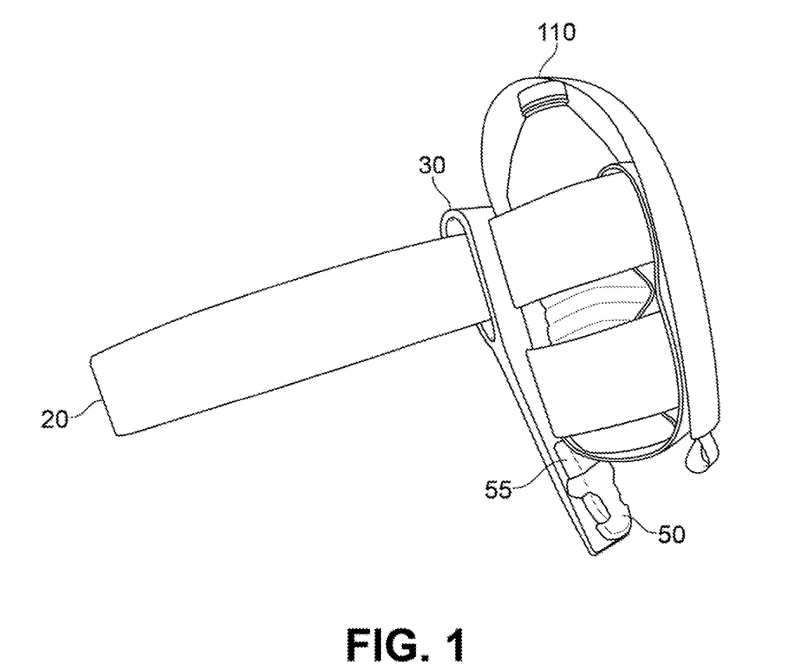
FIG. 1 is a side view of a water bottle storage unit secured by a belt loop to a belt
Figure 8:
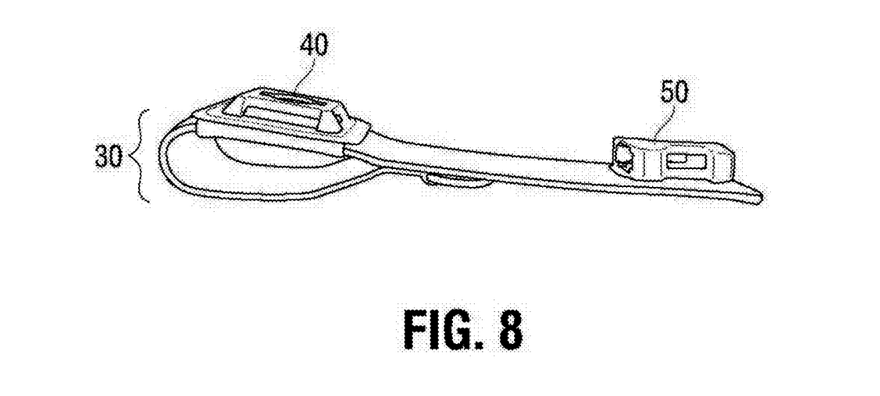
FIG. 8 is an alternative side view of a belt loop base
Figure 9:
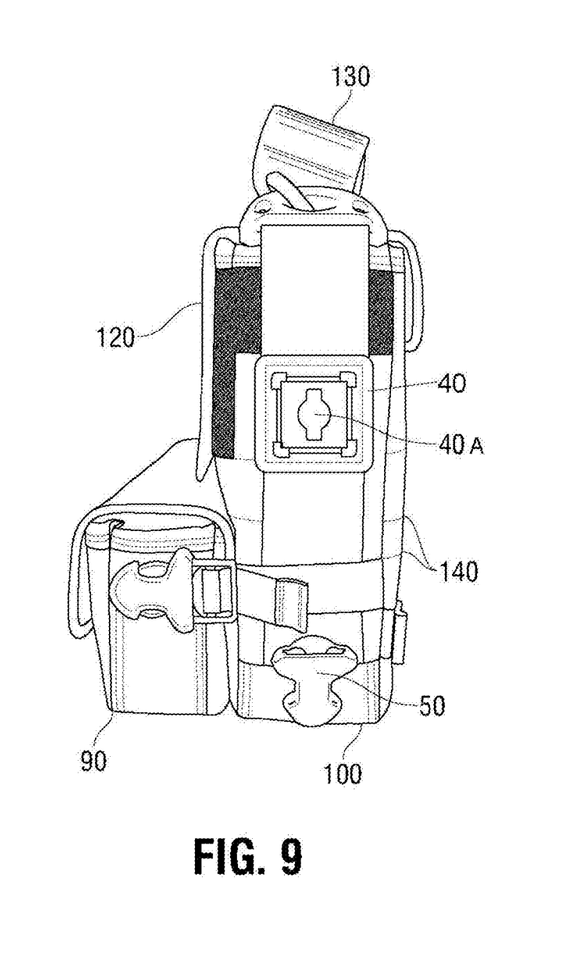
FIG. 9 is a side view of a main bag base, showing uncoupled female upper and lower locking components.
Figure 10:
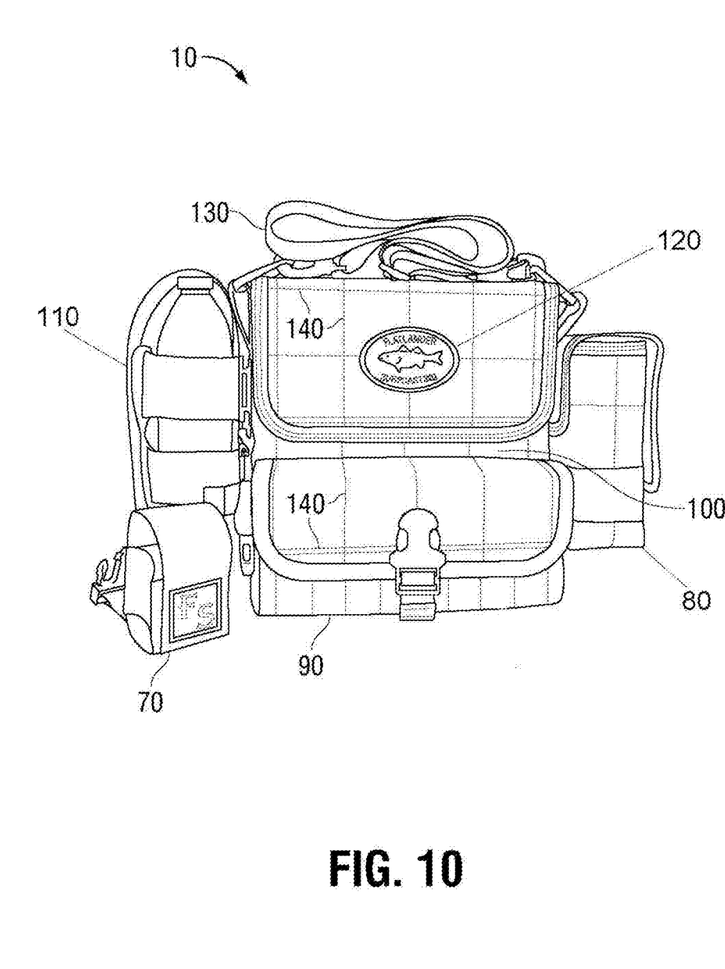
FIG. 10 is a front view of one embodiment of a completely assembled surfcasting bag system, plus an unattached pork rind jar storage unit.

An overview of one embodiment of a complete surfcasting bag system 10 is shown at FIG. 10. A main base bag 100 is shown with four supply storage units 70, 80, 90 and 110. Storage unit 90 is fixed to the main base bag 100 via hook and loop as well as two female latching locks and two male latching locks. Storage units 80 and 110 are shown locked into place. Storage unit 70 is shown free. An overview of a second embodiment of a complete surfcasting bag system is shown at FIG. 1. Belt 20 has an open, flat and a fastened, circular configuration. While in the open, flat configuration, a user can slide a belt loop base 30 over one end. A waist belt 20 is shown threaded through a loop of a belt loop base 30, the base 30 is double-locked to a water bottle storage unit 110. An upper, twistable lock is coupling the belt loop base 30 to the water bottle holder 110, but is hidden from view. The belt loop base 30 without attachments is shown in in a front view at FIG. 5 and at a side view at FIG. 8. The belt loop base 30 has an upper section and a lower section. Note a female half of an upper, twistable lock 40 permanently sewn to the upper section of the belt loop base 30 and a lower, latching lock 50 also permanently affixed to the lower section of the belt loop base 30

Figure 5:
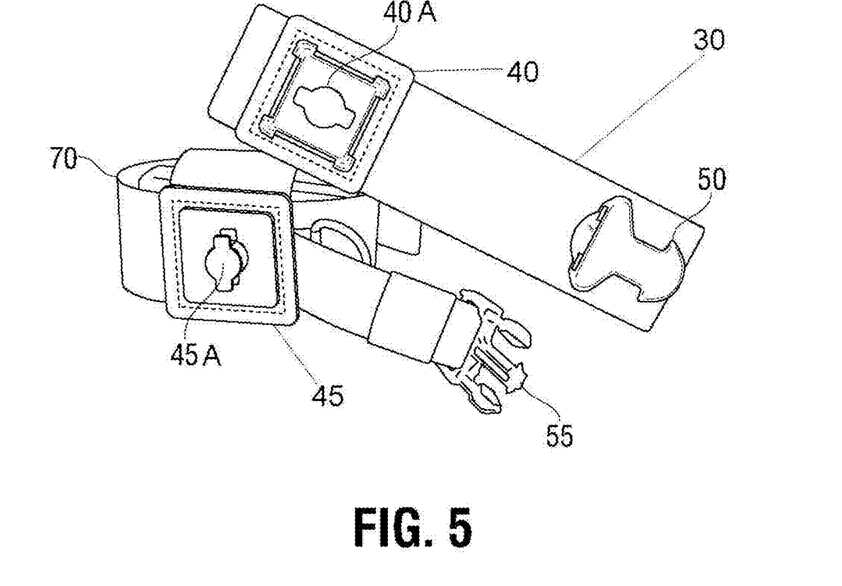
FIG. 5 is a front view of a belt loop, a pork rind jar storage unit and corresponding upper and lower, male and female locking components.

Female and male twistable lock components 40 and 45, respectively, are made of rugged molded nylon, such as the Buddy-Lok™ brand, as it is water- and salt-resistant. In a preferred embodiment, the lock components are 5.71 cm square and 0.476 cm thick each, 0.95 cm thick when coupled. The male component 45 has an elongated center protrusion 45A, illustrated as oriented perpendicular to the primary vertical axis of belt loop base 30, as shown in FIG. 5. The female component 40 has a corresponding elongated center hole 40A, which is shown as oriented parallel to the primary vertical axis of belt 30, as shown in FIG. 5. In practice, the primary axis of protrusion 45A is aligned with the primary axis of hole 40A; and protrusion 45A is inserted into hole 40A; then, twisting the male component 90 degrees clockwise or counterclockwise couples and locks the two components. To release the lock, one simply reverses the motion so that protrusion 45A aligns with hole 40A. With corresponding male and female lock components affixed onto respective bases and storage units, the storage units can be attached and detached on demand with a simple twist of the hand.

As securely as the twisting lock holds storage units to a base, a secondary locking means, in the form of a lower latching lock, which operates in tandem with the twisting lock is included. The latching lock comprises two components, a female component 50 and male component 55. See FIGS. 5, 6 and 7. Latching locks are commonly used as components for backpacks and as seatbelts for chairs for small children. Their common characteristic is that the male and female components linearly slide together and snap into a locked configuration. The latching locks are disconnected by squeezing their sides towards each other, by pushing a button, or by lifting a latch. The latching lock shown in FIG. 5 is exemplary. Other latching locks are suitable for the purposes of this invention. Preferably, the female component of the latching lock 50 measures: 4.66 cm long by 4.25 cm wide and 1.31 cm thick, although other dimensions are possible while still within the scope of this invention. Preferably, the male component of the latching lock 55 is 5.29 cm long, 3.32 cm wide, and 1.03 cm thick, although, again, other dimensions are possible while still within the scope of this invention.

Figure 2:
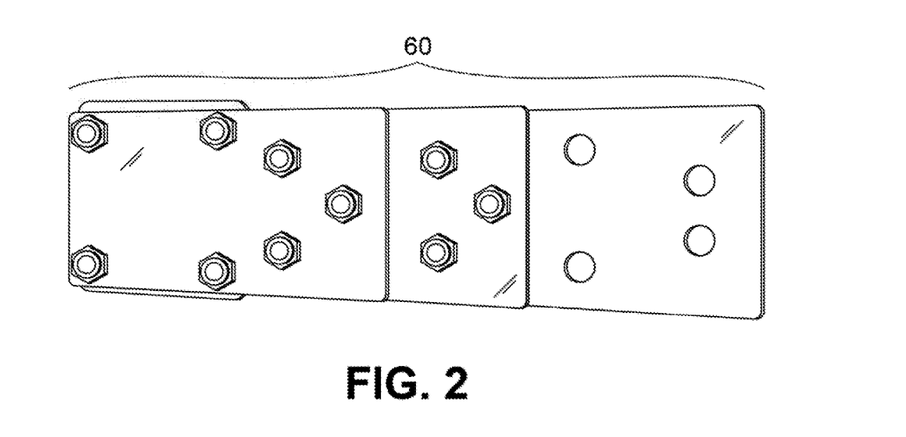
FIG. 2 is a back view of a distancing template tool
Figure 3:
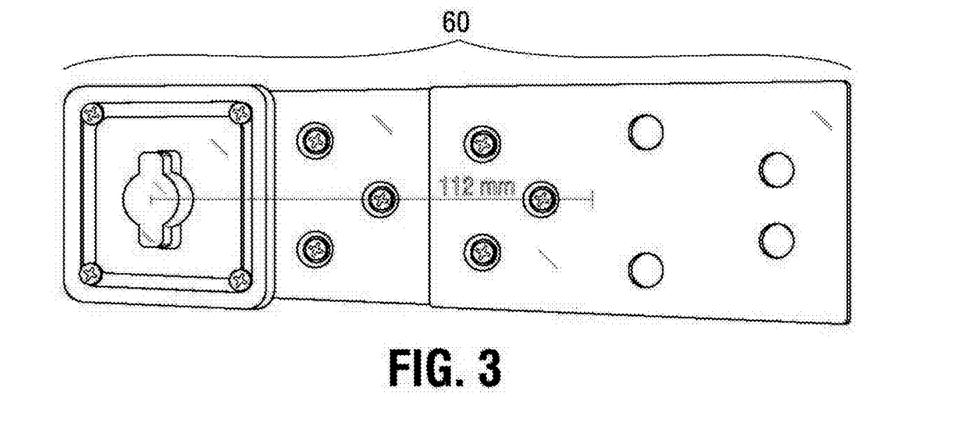
FIG. 3 is a front view of a distancing template tool

To ensure the tandem locking system is uniform across all components, I created a distancing template tool 60. As shown particularly in FIGS. 2-4, the tool comprises a substantially flat, substantially rectangular piece or pieces of metal or other rigid material. Distancing template tool 60 has a front face, a length, a width, a proximal end and a distal end. Affixed to the proximal front of the tool is a single male component 45 of the twistable lock. This single male twisting lock is oriented so that the elongated protrusion is perpendicular to the length of the tool. See especially FIG. 3.

The distal portion of the tool comprises two upper holes and two lower holes created therethrough, these holes generally defining the four sides and the four corners of a regular trapezoid. This trapezoid corresponds to the position of mounting prongs on a female latching lock component. The vertical distance from the center of the male component 45 of the twistable lock to a top segment of this trapezoid is constant. See FIG. 3. In certain preferred embodiments of the invention this vertical distance preferably equals approximately 112 mm, but other dimensions are possible within the scope of this invention, as long as the same distance is used within any one system of bases and storage units.

Figure 4:
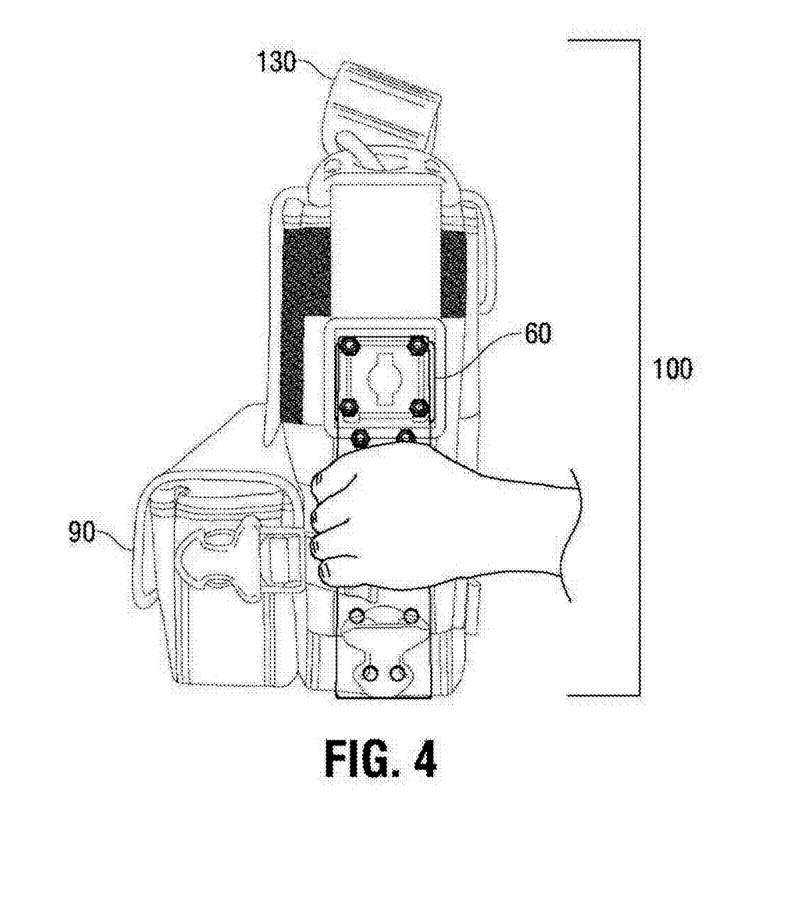
FIG. 4 shows a distancing template tool properly positioned against the right side of the main bag base

FIG. 4 shows how someone might use the distancing template tool 60 to position the female components of the tandem locking system. In practice, the user twist locks into place a front face of the distancing tool against a bag base onto which has been sewn the female twisting lock component. The user can then take a chalk pencil or other fabric marking tool known in the art to mark four dots that generally define a trapezoid and correspond to mounting prongs on a back face of a female half latching lock. The upper, wider two dots indicate where to position a wider end of the female latch, and the lower, narrower two dots indicate where to position the narrowest part of the female latch. See FIG. 4. Depending on the particular design of the latch, other hole configurations may be more suitable. Holes are cut through abrasion-resistant interfacing at the dots and the prongs inserted through the holes made in the abrasion-resistant interfacing, through a corresponding mounting part (not shown) on the reverse side of the fabric and pressed together, similar to how snaps are installed by those skilled in the art. This distancing tool can be used to position female locking components on any receiving base, such as a belt loop base 30, FIG. 5 and FIG. 7, or a shoulder strap base 130, FIG. 10 (locking components not shown).

The distancing template tool is not used to position male locking components on the storage units. For reference, storage units have a front side and a back side. A twisting male locking component 45 is sewn to a strip of webbing which ultimately forms the back side of the storage unit. The male twisting lock is thus positioned on the back side of the storage unit. In FIG. 5, this is shown with a pork rind jar storage unit 70. A second strip of webbing extends from the back side of the storage unit, ending in a male latching lock component 55. This strip of webbing is threaded through a pair of slots in an upper half of the latch and then doubled back on itself. This allows the strip of webbing to be loosened and tightened. Although the corresponding female halves of this tandem lock are a uniform distance apart, it is often more convenient to loosen the male components before insertion and then tighten them to fit once both locks are in place. A similar webbing strip can be seen in FIG. 7 between the belt loop base 30 and a phone or tool storage unit 80.

Figure 6:
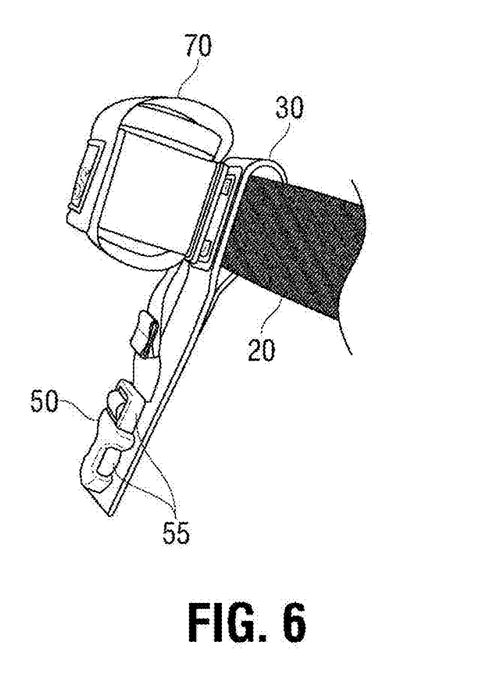
FIG. 6 is a side view of FIG. 5, with the pork rind jar storage unit and belt loop locked together in the upper and lower positions.
Figure 7:
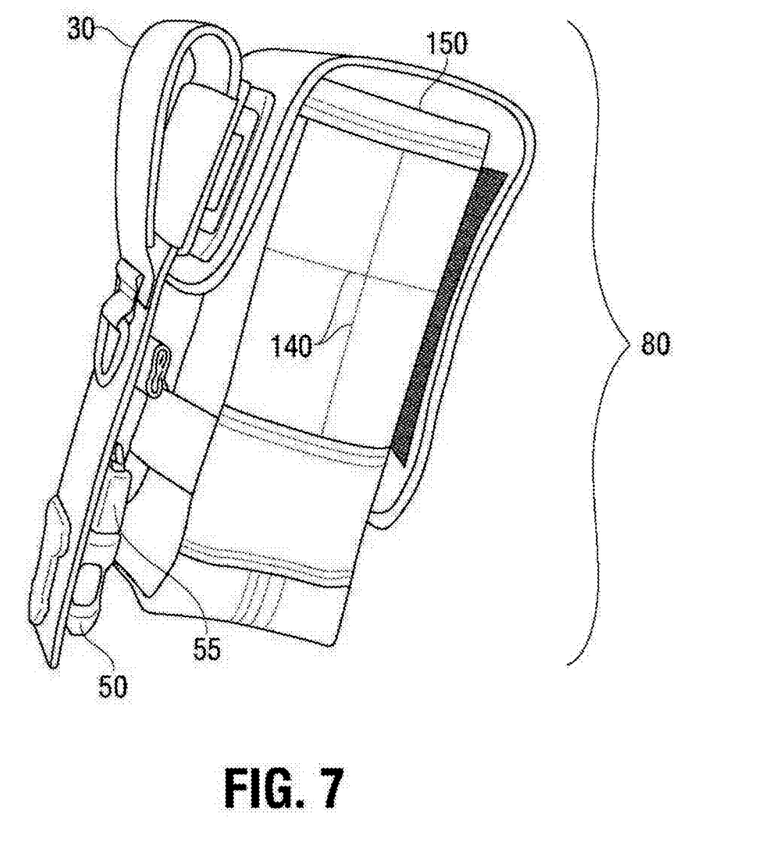
FIG. 7 is a side view of a phone or tool storage unit and belt loop locked together in the upper and lower positions.

To illustrate, FIG. 1 and FIG. 10 show a water bottle storage unit 110 coupled alternatively to a belt 20 and belt loop base 30, or a main bag base 100, respectively. FIG. 6 shows the same belt 20 and belt loop base 30, only this case coupled to a pork rind jar storage unit 70. FIG. 7 shows yet the same belt 20 and belt loop base 30 coupled to a phone or tool storage unit 80.

The advantage of this large and simple locking means is that a user can grasp and turn it even with a thick and wet gloved hand, and even in the dark. There is no need to expose one's hand or fingers to the cold and wet elements. There is no struggle to locate or pinch tiny carabiner prongs, no need to weave wet straps through a D-ring, no metal parts to rust.

I claim:

1. A storage system worn on a fisherman's body, comprising:

a. at least one base;
b. at least one storage unit;
c. at least one twisting lock with a first male component and a corresponding female component;
d. at least one latching lock with a male component and a corresponding female component; and
e. a distancing template tool, wherein the female twisting lock component and female latching lock component are permanently affixed to the at least one base, the first male twisting lock component and male latching lock component are affixed to the at least one storage unit, the first male and corresponding female twisting lock components mate with each other, the male and the corresponding female latching lock components also mate with each other, forming a tandem lock, which selectively and securely couples the at least one storage unit to the at least one base, wherein the distancing template tool defines a uniform and fixed vertical distance between the mated twisting lock components and the mated latching lock components on the at least one base and storage unit, and wherein the distancing template tool is substantially flat and substantially rectangular, has a top front face, a second male component of the at least one twisting lock affixed to and protruding outward from the top front face, a bottom having holes defining four corners of a trapezoid with a top and bottom parallel to a width of the rectangular distancing template tool, and a vertical distance between a geometric center of the second male component of the at least one twisting lock and the top of the trapezoid.

2. The storage system of claim 1, wherein the female components of the tandem lock affixed to the at least one base are separated by the vertical distance.

3. The storage system of claim 2, wherein the first male twisting lock component is affixed to a back side of the at least one storage unit.

4. The storage system of claim 3, further comprising an adjustable length of webbing having a proximal end affixed to the back side of the at least one storage unit, and a distal end affixed to the male latching lock component.

5. A method of surfcasting comprising: a fisherman putting on his body the storage system of claim 1, the fisherman wading into a body of water and surfcasting.

* * * * *